(12) United States Patent
Kock et al.

(10) Patent No.: US 7,685,902 B2
(45) Date of Patent: Mar. 30, 2010

(54) INDUSTRIAL ROBOT

(75) Inventors: Sönke Kock, Pfungstadt (DE); Roland Oesterlein, Heidelberg (DE); Torgny Brogårdh, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/502,205

(22) PCT Filed: Feb. 5, 2003

(86) PCT No.: PCT/SE03/00200

§ 371 (c)(1),
(2), (4) Date: Feb. 7, 2005

(87) PCT Pub. No.: WO03/066289

PCT Pub. Date: Aug. 14, 2003

(65) Prior Publication Data

US 2005/0172750 A1    Aug. 11, 2005

(30) Foreign Application Priority Data

Feb. 6, 2002 (SE) .................................. 0200343

(51) Int. Cl.
*B25J 17/00* (2006.01)
*B66C 1/00* (2006.01)
(52) U.S. Cl. ..................... 74/490.06; 901/28; 414/735

(58) Field of Classification Search ................. 700/245; 74/490.01, 490.06, 490.03, 490.05; 414/917, 414/680, 729, 735; 901/8, 15, 28, 29
See application file for complete search history.

(56) References Cited

U.S. PATENT DOCUMENTS

| 4,976,582 | A | * | 12/1990 | Clavel | .................. 414/729 |
| 5,539,291 | A | * | 7/1996 | Reboulet | ............... 318/568.11 |
| 5,699,695 | A | * | 12/1997 | Canfield et al. | .......... 74/490.06 |
| 5,725,352 | A | | 3/1998 | Tanaka | |
| 5,857,826 | A | | 1/1999 | Sato et al. | |
| 6,543,987 | B2 | * | 4/2003 | Ehrat | .................. 414/735 |
| D478,921 | S | * | 8/2003 | Kullborg et al. | ........... D15/199 |
| 7,011,489 | B2 | * | 3/2006 | Brogardh et al. | ............ 414/735 |
| 2004/0211284 | A1 | * | 10/2004 | Roy et al. | ................. 74/490.01 |

FOREIGN PATENT DOCUMENTS

| WO | WO 97/33726 | 9/1997 |
| WO | WO 99/58301 | 11/1999 |
| WO | WO 02/22320 A1 | 3/2002 |

* cited by examiner

*Primary Examiner*—Thomas R Hannon
*Assistant Examiner*—James Pilkington
(74) *Attorney, Agent, or Firm*—Venable LLP; Eric J. Franklin

(57) ABSTRACT

An industrial robot including a parallel kinematic manipulator of an object in space. The manipulator includes a stationary platform, a movable platform for carrying the object, and at least three arms connecting the platforms. Each arm includes a first arm part connected to the stationary platform for manipulating the movable platform.

25 Claims, 10 Drawing Sheets

INDUSTRIAL ROBOT

CROSS-REFERENCE TO RELATED APPLICATIONS

This application claims priority to Swedish patent application 0200343-2 filed 6 Feb. 2002 and is the national phase under 35 U.S.C. § 371 of PCT/SE03/00200.

TECHNICAL FIELD

The present invention relates to an industrial robot, including a manipulator and a control unit having means for automatically operating the manipulator. The manipulator comprises a parallel kinematic manipulator including at least three arms, each comprising a link arrangement. The three link arrangements together carry, directly or indirectly, a working platform member arranged to execute the function aimed at.

The determination "parallel kinematic manipulator", PKM, is defined as a manipulator comprising a first stationary element, a second movable element (platform) and at least three arms. Each arm comprises a supporting first arm part and a second arm part, the latter consisting of a link arrangement connected to the movable platform. Each first arm part is actuated by a driving means preferably arranged on the stationary element to reduce the moving mass. These link arrangements transfer forces due to actuation of the supporting first arm parts when manipulating the movable platform.

BACKGROUND OF THE INVENTION

The well-known robot type named SCARA robot is a serial kinematic manipulator primarily used for moving and rotating objects without changing the inclination of the objects. The manipulator comprises kinematic links coupled in series. These robots normally have four degrees of freedom in the x-, y-, z-directions and $\phi_z$ (rotation of the object about an axis parallel to the z-axis). For manipulating the object in the xy-plane, two arms coupled in series and working in the xy-plane are used. In order to achieve a movement in the z-direction a linear movement device is used. This device is arranged either after the arms coupled in series or before the arms coupled in series. In the first case the arms coupled in series must move the drive assembly for the z-movement and in the latter case the drive assembly for the z-movement must move the arms coupled in series. The drive assembly for the $\phi_z$-movement will always be located at the extreme end of the kinematic chain of the robot.

Several of the properties concerning the SCARA-robot are improved with a robot, which manipulates an object through working in parallel, i.e. a parallel kinematic manipulator, PKM. According to the statements above, a serial kinematic robot comprises a large mass and thus becomes compliant with low mechanical natural frequencies, the accuracy is limited and large motor torques are required for accomplishing high acceleration, jerk and speed movements possible.

A parallel kinematic robot is a design offering a high degree of load capacity, high stiffness, high natural frequencies and low weight. Three arms working in parallel are required to obtain manipulation of a platform in three degrees of freedom, i.e. the x, y and z-directions in a Cartesian system of coordinates. Six arms working in parallel are required to obtain manipulation of a platform in all six degrees of freedom, i.e. the x, y, z directions and the rotation angle/inclination of an object arranged on the platform.

Ideally, an object ought to be manipulated by a total of six separate links, which transfer only compressive and tensile forces to the manipulated object to obtain a stiff and accurate manipulation. Generally, the PKM comprises three up to six first arm parts. As an example, a manipulator with four arms designed for four degrees of freedom has second arm parts sharing the six separate links. This is only possible with certain combinations of the links, as for example, 2/2/1/1 or 3/1/1/1. 2/2/1/1 means that two supporting first arm parts are connected to the respective second arm part, which comprises two links and another two supporting first arm parts are connected to the respective second arm part, which comprises a single link.

A known manipulator is manipulating a platform, which remains with unchanged inclination in the whole working area. The robot has three supporting first arm parts, each connected to a second arm part, in kinematic parallelism. From this robot, it is known to arrange a total of six links optionally distributed on three first arm parts according to the combinations 2/2/2 or 3/2/1.

A known device for relative movement of a first element in relation to a second element according to the combination 2/2/2 is disclosed in the international application WO 99/58301. The three arms, each comprises a supporting first arm part connected to a second arm part, which includes a link arrangement. The first element is described as stationary and the second element is manipulated in the x-, y- and z-direction by driving means. Each link arrangement is connected to a supporting first arm part and to the second element, respectively, by means of joints of 2 or 3 degrees of freedom. Each driving means comprises a stationary portion and a rotating portion, where the stationary portion is included in the first, stationary element. Using the reference numbers in the document, each driving means has its rotating portion connected to the first arm parts 6, 7 and 8. The driving means 3 is pivoting the first arm part 6 and the driving means 4 is pivoting the first arm part 7 about the same geometrical axis 37. The third driving means 5 is pivoting the first arm part 8 about a geometrical axis 38, which is non-parallel to the pivoting axis 37. The third driving means 5 implies that upon pivoting of the supporting arm part 7 by means of the driving means 4 also the supporting arm part 8 will accompany as a consequence of the fact that an axis 53 and also a gear wheel 10 will accompany the pivoting movement. Thus, the driving means 4 and 5 must accelerate more and are more heavily loaded compared with the driving means 3. Consequently, this manipulator design necessitates three different driving means designs with three different drive dimensions. This makes the design more complicated and the manipulator relatively expensive to process. Another consequence is that the first driving means carries the highest moment of inertia and there will be an uneven distribution of the moment of inertia in the manipulator. Moreover, the mechanical natural frequencies will be lower because of the extra mass that axis 2 has to rotate, which gives a less accurate control at higher motion frequencies.

A device for relative movement of a first and a second element according to the second combination 3/2/1 is disclosed in the international application WO 97/33726. The device comprises a manipulator including three arms each arranged to connect a stationary and a movable platform. Each arm comprises a supporting first arm part and a second arm part connected to each other, where respective second arm part comprises a link arrangement. Three actuators are fixed to the stationary platform and actuate one first arm part each. A first supporting arm part is connected to a second arm part linkage arrangement comprising three links in parallel. Another first arm part is connected to a double link arrangement and still another first arm part is connected to a single link, where all links are connected to the movable platform.

The document U.S. Pat. No. 5,539,291 shows a parallel kinematic manipulator. A stand sustains a biaxial controllable supporting arm part. This arm part supports, in its turn, a second arm part, which sustains a movable object. A first and a third supporting arm pivoting around a common pivot axle are connected to the movable object via outer arms comprising belts with the function of a combination between an arm part and a four linkage. The outer arms and the second supporting arm are arranged to transmit compressive and tensile forces as well as torsion moments. The result is a relatively bulky design of a manipulator with a limited operating volume. Moreover, the shown manipulator comprises less stiffness, lower accuracy and much lower mechanical natural frequencies when compared with a manipulator comprising arm parts transmitting only compressive and tensile forces.

A robot is operating within a volume needed for the application, which is referred to as the operating volume in the following. Furthermore, the volume outside the operating volume, which a manipulator needs for its own purpose, is referred to as the unused operating volume. Prior art includes a manipulator, which has a voluminous and expensive design with a limited operating volume (FIG. 16 in the prior art). For certain robot applications, it is important due to enormously high initial costs to make a PKM with a small unused operating volume in relation to the operating volume and which can work close to each other.

According to the conditions mentioned above, there is a need for an industrial robot with high accuracy and stiffness. Further, there is a need for a robot with an improved course of dynamic forces and simultaneously an increased working volume in relation to the unused manipulator volume. Further, there is a need for a robot, which has the characters of rapidness and an exact movement. Additionally, there is a need for a robot design which makes the robots work close to each other.

The known industrial robots comprising a parallel kinematic manipulator do not satisfy this need.

SUMMARY OF THE INVENTION

The object of the invention is to provide a rapid PKM, defined above, that offers high accuracy, stiffness and an increased operating/unused operating volume ratio. A second object of the invention is to provide a method for a fast and accurate manipulation of an object. A third object of the invention is to use a robot according to the first aspect and a method according to the second aspect for high accuracy operations.

These objects are achieved according to the invention in a first aspect by an industrial robot, in a second aspect by a method in an industrial robot for manipulating an object with high accuracy, and a use of the method.

The solution according to the first aspect of the invention is to provide an industrial robot including a parallel kinematic manipulator for movement of an object in space. The manipulator includes a stationary platform, a movable platform for carrying the object and at least three arms connecting the platforms. Each of the at least three arms comprises a first arm part connected to the stationary platform for endless rotation around an axis.

The possibility for a first arm part to rotate more than 360° is referred to as endless rotation.

The parallel kinematic manipulator comprises at least three independent supporting first arm parts, each connected to a second arm part. The second arm parts together comprise in total 6 links with only axial forces and are arranged, as described above, to connect the platforms, optimizing the overall accuracy and stiffness of the manipulator.

The at least three first arm parts of the parallel kinematic manipulator according to the invention are arranged with the possibility of endless rotation about one or several axes. Thus, the endless rotation of the PKM reduces the unused operating volume to one or several different cylindrical volumes around respective axis of rotation and the unused operating volume is decreased. Another consequence of this design is that the minimum and maximum radial operating distance between the movable platform and respective axis of rotation is increased and consequently, the operating volume is increased. A reduced unused operating volume and an increased operating volume results according to the invention in an increased operating/unused operating volume ratio.

The robot according to the invention has a desirable dynamic character due to even dynamic force distribution and to lack of undesirable torsion and bending forces in the design. This results in high speed, acceleration and accuracy of the robot.

In one embodiment of the invention, the supporting first arm parts are arranged to rotate around one of at least two parallel axes. Each first arm part is arranged connected to the stationary platform and is actuated by a separate actuating means. Furthermore, actuating means is arranged to actuate only one single supporting arm part each and not actuating any part of the stationary platform or any other actuator. Therefore, the design of the robot according to the invention has a decreased moving mass compared to prior art robots. It is possible to have low effect as well as low mass of the actuators actuating the arms. This minimizes the moment of inertia and maximizes the acceleration and speed capability of the robot at an available torque level. This design is free from sources of undesirable play. The result according to the invention is a robot design with low mechanical natural frequencies and transmission errors and therefore possessing a minimum moment of inertia and even distribution of the same and furthermore a design free from undesirable stresses. This results in a robot, in accordance with the invention, having high accuracy and desirable dynamic performance.

According to the invention, the robot comprises a manipulator with arms rotating around parallel axes, which reduce the unused operating volume, defined above. This results in a compact robot, which due to the design has the premises of operating within a large operating volume. Furthermore, the robot according to the invention comprises a manipulator, which lacks positions with an arm extending undesirably in space during operation.

In one embodiment of the invention, a robot comprises three arms including one first arm part each. Each first arm part is arranged to rotate around an axis, which is parallel to and at a distance from a rotation axis of one of the other first arm parts. Thus, the arms are arranged on a stationary platform to rotate around three different rotation axes.

According to the invention, a robot comprises three, four, five or six arms including one first arm part each. The three, four, five or six first arm parts are arranged to rotate around a common axis. Thus, the arms are connected to the stationary platform and arranged to rotate around a common rotation axis.

According to the invention, the robot comprises a universal column concept, which is suitable to arrange on a floor, on a wall, between two walls or from a ceiling irrespective of the orientation of the column. According to the invention, the stationary platform comprises a column arranged with a detachable robot stand in either end of the column.

According to the invention, the robot comprises three, four, five or six arms and is designed for manipulation in three, four, five or six degrees of freedom. There are also embodiments where a redundant arm is necessary to eliminate singularities in a working area of a robot. A singularity for a parallel robot is defined as a configuration where the manipulated platform gains one degree of freedom, which makes the platform impossible to control. Usually, the parallel arm structure will collapse when it enters a singularity. Moreover, the PKM will be very compliant and inaccurate close to a singularity.

According to the invention, at least one redundant arm is arranged to rotate an object to be manipulated. Two arms rotating the object offer a higher force of rotation compared to prior art robots comprising a local driving means arranged for rotation of the object.

According to still another embodiment of the invention, the robot comprises six arms connecting the movable platform with a second arm part comprising one link each. This robot design results in a robot, which manipulates one degree of freedom with each arm. It is named a 6 DOF manipulation parallel robot design, which obtains both the 3-degree of freedom positioning and the 3-degree of freedom orientation of a manipulated platform.

The solution according to the second aspect of the invention is to provide a method in an industrial including a parallel kinematic manipulator for movement of an object in space. The manipulator includes a stationary platform, a movable platform for carrying the object, at least three arms connecting the platforms and actuating means for actuating the arms. The actuating means are individually actuating the arms to endless rotation in different planes.

According to the invention, the PKM comprises three, four, five or six arms arranged to rotate around a common axis in parallel planes. In one embodiment of the invention, six robot arms are brought to manipulate an object in one degree of freedom each. In still another embodiment, the object is manipulated in constant inclination.

According to the invention, the PKM comprises three, four, five or six arms arranged to rotate around one of at least two separate parallel axes in parallel planes. Accordingly, the operation volume is brought to vary during rotation.

According to the invention, one alternatively two redundant arms are, defined above, bringing an object to be manipulated into endless rotation.

The solution according to the third aspect of the invention is to use a robot according to the first aspect and a method according to the second aspect for high accuracy operations, in for example applications measurements, laser cutting, assembly, disassembly, fettling of castings or machining.

In a further embodiment according to the fist aspect of the invention, a robot comprises three supporting first arm parts and two of them are secured relative to each other. This embodiment comprises a robot working in a plane (2DOF).

BRIEF DESCRIPTION OF THE DRAWING

The invention will be explained more closely by the description of different embodiments thereof and with reference to the appended drawing in which.

DESCRIPTION OF THE PREFERRED EMBODIMENTS

Figure 1:
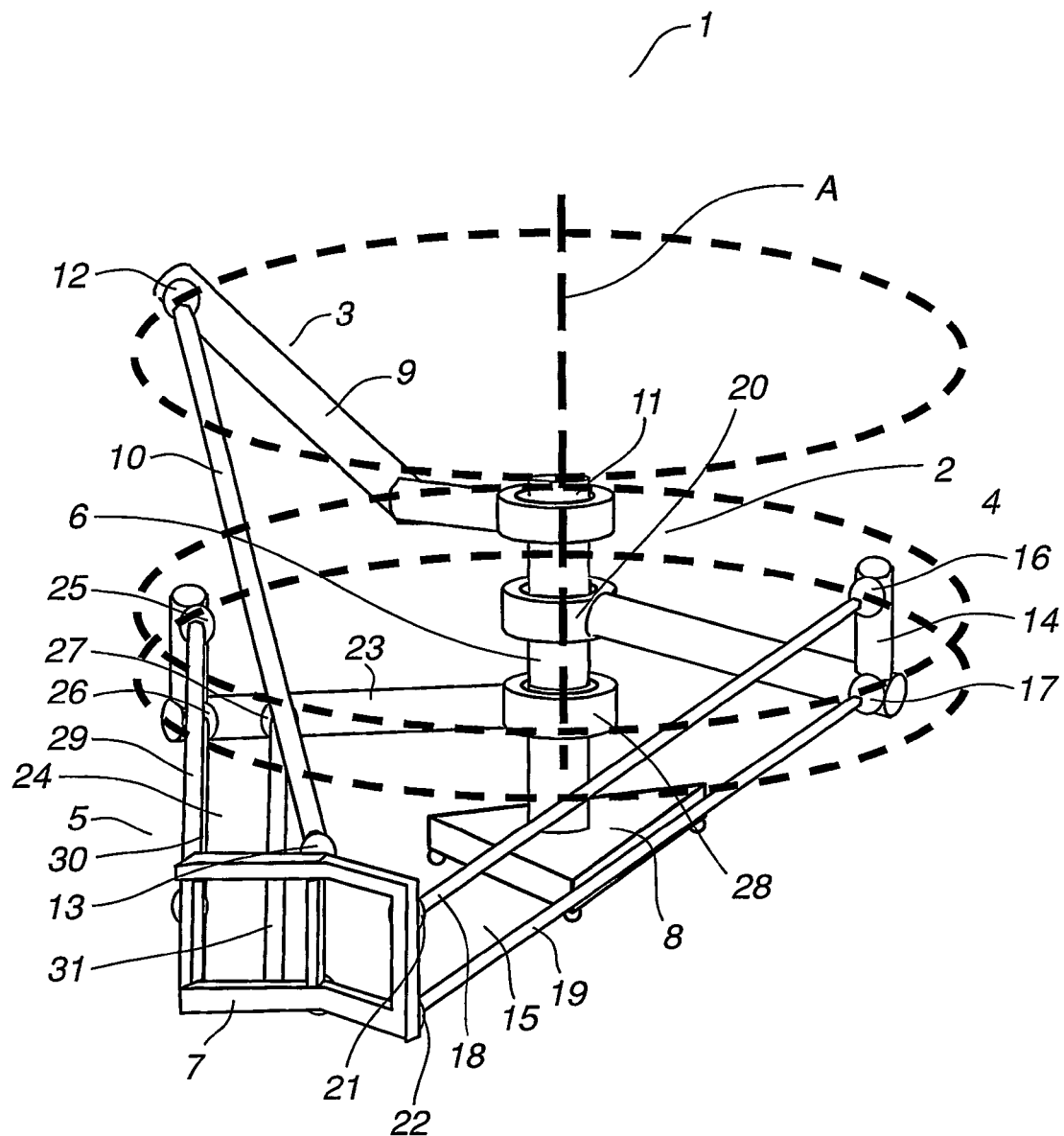
FIG. 1 is an industrial robot according to the invention of the combination 3/2/1.

FIG. 1 is an industrial robot 1 comprising a manipulator 2 with three arms 3, 4, 5 arranged rotating around a common axis A. The arms 3, 4, 5 are connecting a stationary column 6a and a movable platform 7 in the combination 3/2/1 for carrying an object 7a (FIG. 2) to be manipulated. The column 6a is supported by a detachable stand 8, which is fixed to the ground.

The first arm 3 comprises a supporting first arm part 9 and a second arm part comprising a link arrangement 10 pivotally connected in series via a joint 12. The supporting first arm part 9 is rotationally attached to the column 6 through connecting means 11. The link arrangement 10 is pivotally connected to the movable platform 7 via a joint 13.

The second arm 4 comprises a supporting first arm part 14 and a second arm part comprising a link arrangement 15 pivotally connected in series via joints 16 and 17. The supporting first arm part 14 is rotationally attached to the column 6a through connecting means 20. The link arrangement 15 comprises two links 18, 19 of the same length, arranged in parallel and pivotally connected to the movable platform 7 via joints 21 and 22.

The third arm 5 comprises a supporting first arm part 23 and a second arm part comprising a link arrangement 24 pivotally connected in serial via joints 25, 26 and 27. The supporting first arm part 23 is rotary attached to the column 6 through connecting means 28. The link arrangement 24 comprises three links 29, 30 and 31 of the same length, arranged in parallel and pivotally connected to the movable platform 7 via joints 32, 33 and 34 (not shown), respectively. The supporting first arm parts 9, 14 and 23 are rotating about a common axis A and therefore their movements will be in parallel planes when actuated and this rotation is shown in FIG. 1 by the broken lines.

In one embodiment (not shown), the robot is used for manipulating the platform 7 in the xy-plane with a constant position in the z-direction. This is made by keeping joint 12 vertically above joints 25 and 26 and mounting joint 13 vertically above joints 33 and 34. This is also achieved in an alternative embodiment by keeping joint 12 vertically above joints 16 and 17 and mounting joint 13 vertically above joints 21 and 22. The first arm part 9 is then either synchronously controlled with respect to the first arm part 23 and the first arm part 14, respectively.

Joint 12 is then kept vertically above joints 25 and 26 or alternatively above joints 16 and 17 by mechanical locking of the first arm part 9 (supporting joint 12) to the first arm part 23 (supporting joints 21 and 22), alternatively to the first arm part 14 (supporting joints 16 and 17). Another possibility is to control the first arm part 9 synchronously with the first arm part 23 respective the first arm part 14.

Figure 2:
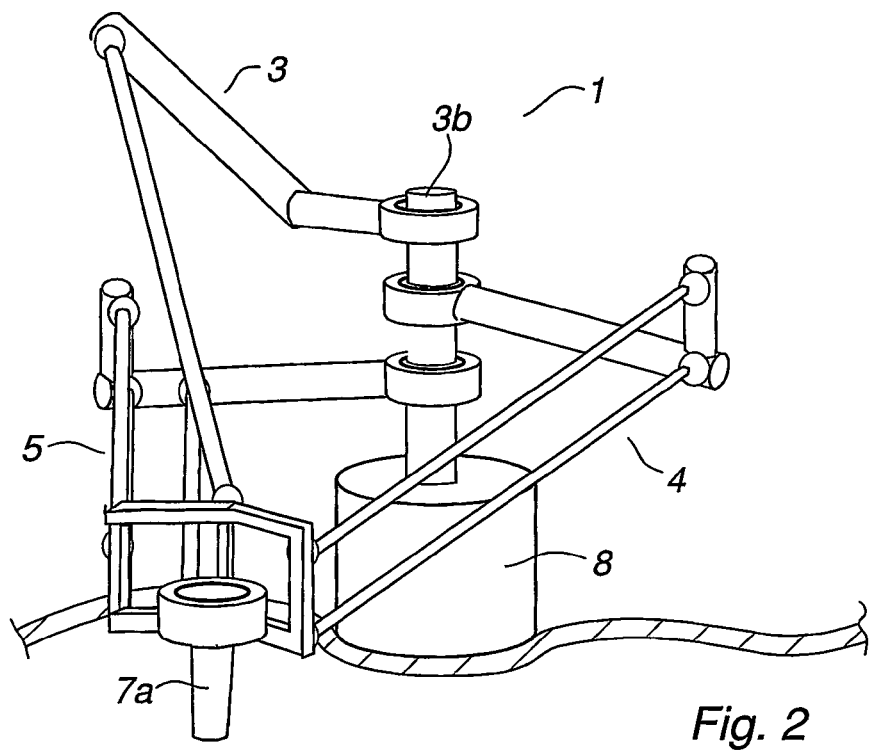
FIG. 2 is an industrial robot according to FIG. 1 arranged in a floor position.
Figure 3:
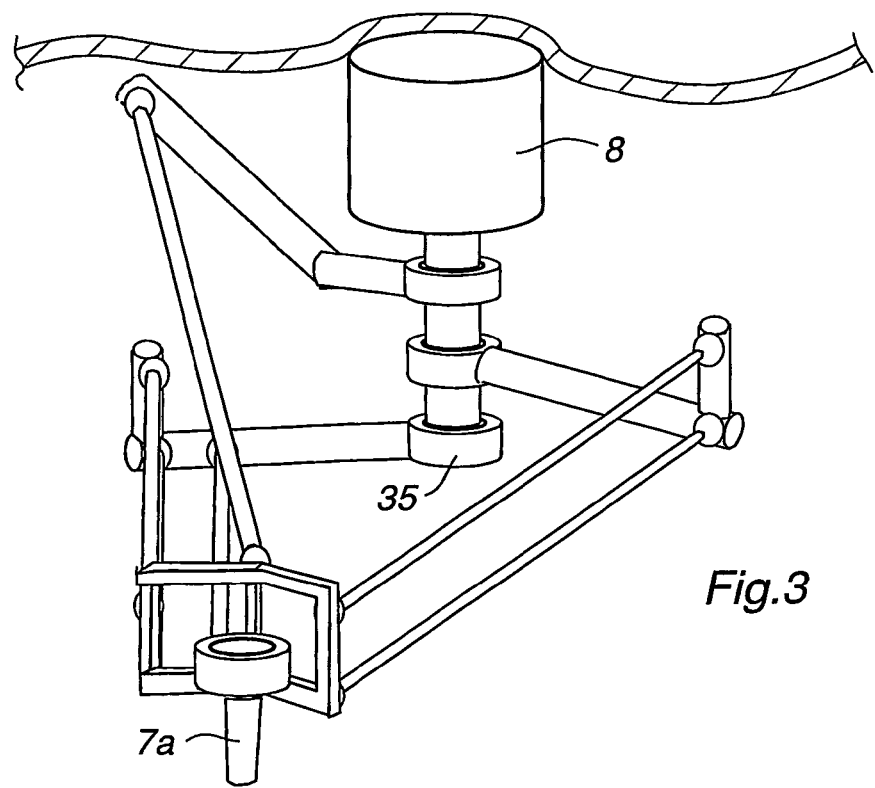
FIG. 3 is an industrial robot according to FIG. 1 arranged in a roof position.

A possible change of position is made according to the following. The robot stand 8 (FIG. 2) is dismounted from the first end 35 of the column 6, turned upside down and attached to the second end 36 of the column 6. FIG. 3 is the industrial robot according to FIG. 2 after the change to a roof position. It is emphasized that the column 6 and the arms 3,4 and 5 have the same orientation in both FIGS. 1, 2 and 3.

Figure 4:
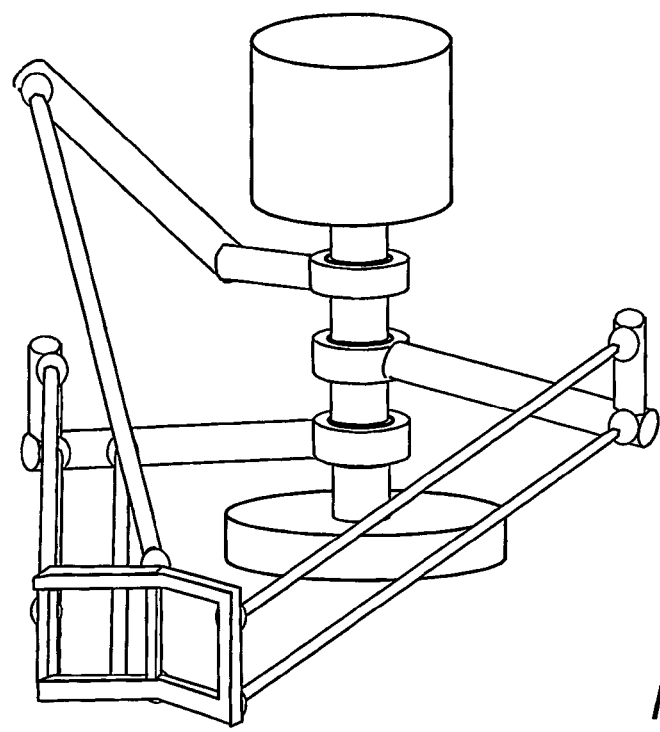
FIG. 4 is an industrial robot according to FIG. 1 arranged in a portable position.

FIG. 4 is an alternative embodiment of the invention. The robot in FIG. 2 is detached from the roof position and equipped with a robot foot 37 attached to the first end 35 of the column 6. It is emphasized that the column 6 and the arm system have the same orientation in both FIGS. 3 and 4.

The industrial robots in the FIGS. 1-4 are the same robot of the combination 3/2/1 comprising three arms 3, 4 and 5, which are designed for manipulating an object in the x-, y- and z-direction by means of force applying arrangements (not shown). The robot is designed to allow the supporting first arm parts 9, 14 and 23 rotation about one single axis A, which they have in common. The second arm parts closest to the movable platform are the link arrangements 10, 15 and 24, respectively, and they share the necessary six links in the combination 3/2/1. The joints 12, 16, 17, 25, 26 and 27 are designed to allow a relative movement of three degrees of freedom between respective supporting arm parts 9, 14 and 23 and link arrangements 10, 15 and 24. Two of the said three degrees of freedom consist of pivoting in all directions about two real or imaginary axes placed at an angle to each other and the third is in the form of rotation of an individual link about its longitudinal axis. In reality, the individual joints 12, 16, 17, 26 and 27 comprise ball joints or universal joints.

The link arrangement 10 is connected to the movable platform 7 through the joint arrangement 13. The link arrangement 15 is connected to the movable platform 7 through the joint arrangements 21 and 22. The link arrangement 24 is connected to the movable platform 7 through the joint arrangements 32, 33 and 34. The joints 13, 21, 22, 32, 33 and 34 are designed to allow a relative movement of two or three degrees of freedom between the link arrangement 10, 15, 24 and the movable platform 7, respectively. In reality, the individual joints 13, 21, 22, 32, 33 and 34 comprise universal joints or ball joints. In the former case, one degree of freedom in the form of rotation of an individual link about its longitudinal axis is eliminated.

The arms 4 and 5 are mainly manipulating the platform 7 in the x y-plane and the arm 3 is manipulating the platform 7 mainly in the z-direction. The three arms together manipulate the position of the movable platform 7 under a constant inclination of the platform 7.

Figure 5:
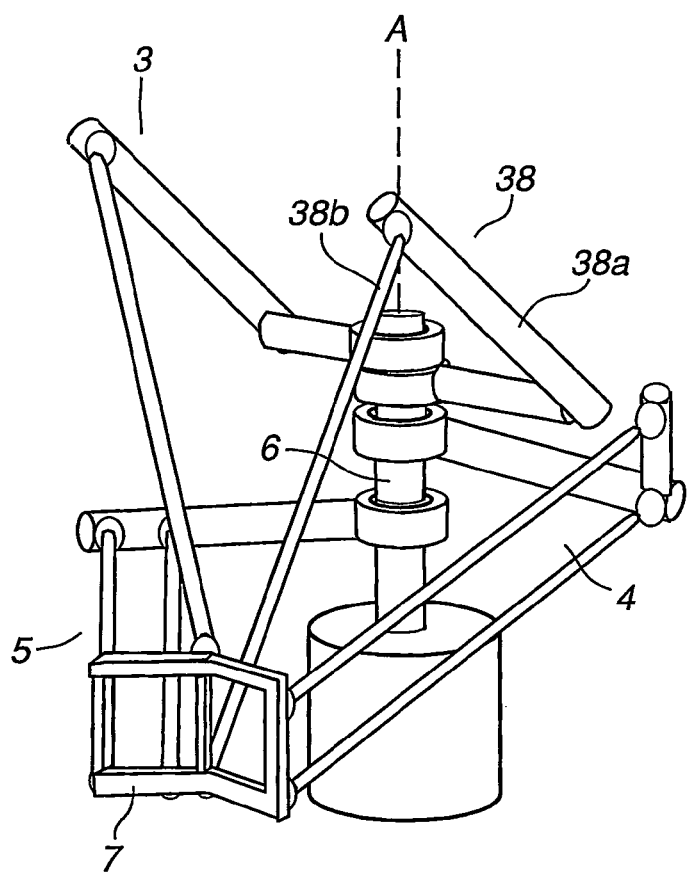
FIG. 5 is an industrial robot according to the invention of the combination 3/2/1 arranged with a redundant first arm part.

FIG. 5 is an industrial robot of the combination 2/2/1/1 designed for manipulation of an object in four degrees of freedom, the x-, y-, z-direction and tilting. It comprises a robot according to FIG. 1 reduced with the link 29 and completed with a fourth arm 38 arranged to rotate about the common axis A between the arms 3 and 4, connecting the stationary column 6 and the movable platform 7 via a first arm part 38a connected to a second arm part link arrangement 38b. When the first arm part 38a is rotated relative to the other arms, the platform 7 will be tilted, making it possible to adapt the platform orientation to the need of the application for the robot.

Figure 6:
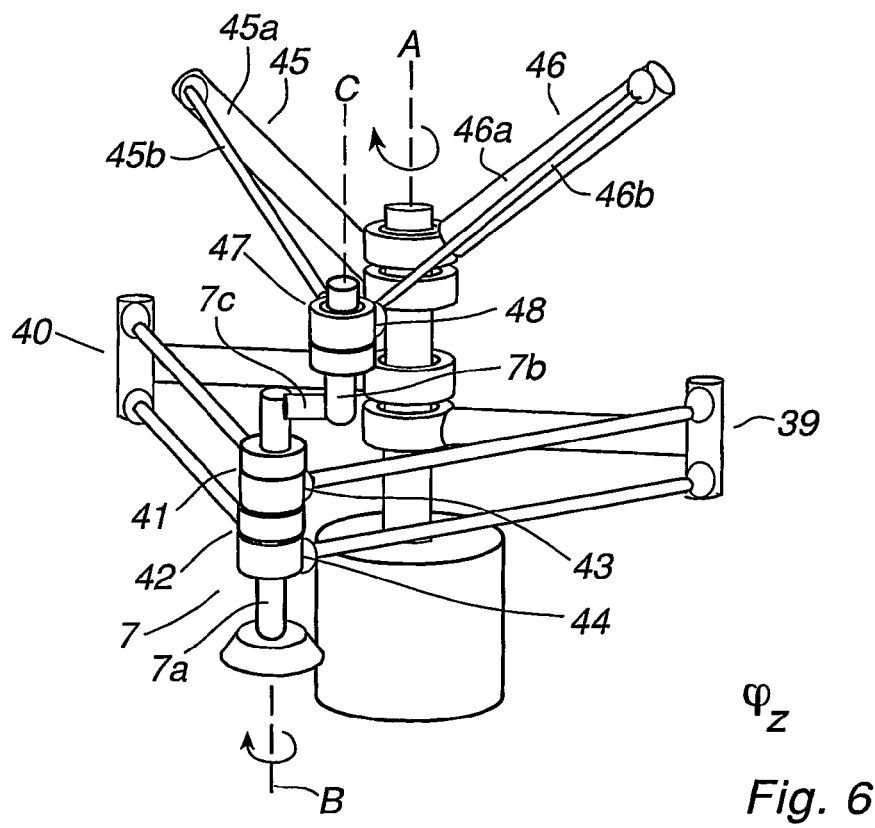
FIG. 6 is an industrial robot according to the invention of the combination 2/2/1/1 comprising an extended movable platform.

FIG. 6 is an industrial robot according to the invention of the combination 2/2/1/1 with four arms 39, 40, 45 and 46. Each arm comprises a supporting first arm part 39a, 40a, 45a, 46a arranged to rotate about the axis A of the stationary column, and a second arm link arrangement 39b, 40b, 45b and 46b jointly connecting the respective first arm part and the movable platform. The first arm parts manipulate the platform 7 via the second arm parts comprising links in the combination 2/2/1/1. The arm system is in this case designed for the manipulation of an object in four degrees of freedom, the x-, y-, z-direction and $\phi_z$-rotation.

In FIG. 6, the first arm part 39 and the second arm part 40 are arranged to manipulate the platform 7 mainly in the xy-plane. Each first arm part 39, 40 is connected to the extended movable platform 7 via one second arm part each comprising two parallel links and corresponding joints 41, 42 and 43, 44, respectively, and the links are arranged to rotate about a common axis B.

The third and fourth supporting arm parts 45 and 46 are arranged to manipulate the platform 7 mainly in the z-direction and to give the platform a $\phi_z$-rotation. Thus, the arrangement will manipulate the position of an object 47, its height and distance to the axis A, and also the rotation of the object about an axis B. The rotation is limited to $^+\!\_0.50°$ about the axis B. This arm structure will not work with a 180° rotation.

The design described above with the two pairs of parallel links connected to the movable platform leads to parallelism between the axes A and B. However, there are positions where the autonomous height and direction are lost, called singularities. This means that there are positions where the manipulator loses control of the platform, positions where the platform actually will gain a degree of freedom.

Further, FIG. 6 is a robot comprising a platform 7, which is designed to comprise two parallel crank parts 7a and 7b connected by a third connecting part 7c. The joints 41, 42, 43 and 44 are arranged on the platform part 7a to rotate about a common z-axis B. The joints 41, 42, 43 and 44 are designed to allow a relative movement of two or three degrees of freedom. The second arm parts 45b and 46b are connected to the platform part 7b via joints 47 and 48, respectively. These joints are designed to allow a relative movement of two or three degrees of freedom and are arranged on the platform part 7b to rotate about a common axis C. The design of the robot in FIG. 6 allows an accurate rotation of the platform 7 of up to about $^+\!\_0.50°$ around the axis B as mentioned above.

Figure 7:
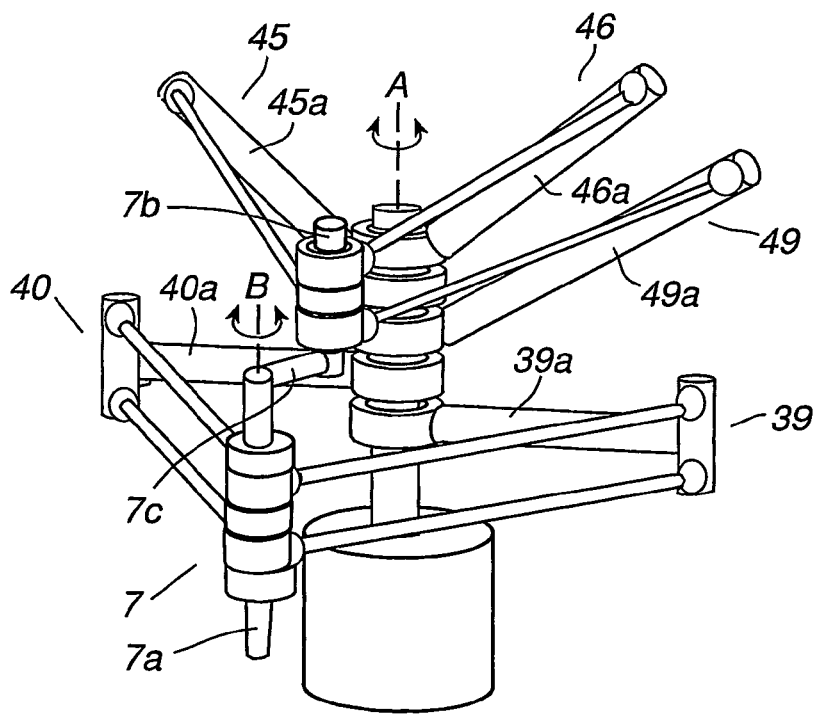
FIG. 7 is an industrial robot according to FIG. 6 arranged with a redundant arm.

FIG. 7 is a modification of FIG. 6 with a redundant arm 49 added, which comprises a first arm part 49a arranged to rotate about the A-axis between the supporting first arm parts 40a and 45a. The uppermost rotating first arm part 46a is mainly manipulating the height of the movable platform 7. The two lowest supporting first arm parts 39a and 40a, respectively, allow manipulation mainly in the xy-plane. The first arm part 45a, together with the redundant first arm part 49a, allows full rotation of the platform 7, defined as any number of turns, about the axis B. In singularity positions according to the robot in FIG. 6, the redundant arm 49 according to FIG. 7 is used to control the movement of the platform 7b. As an alternative, a servo for the redundant arm controls the force on the second arm link arrangement instead of its position to make the redundant control outside the singularity positions.

Figure 8:
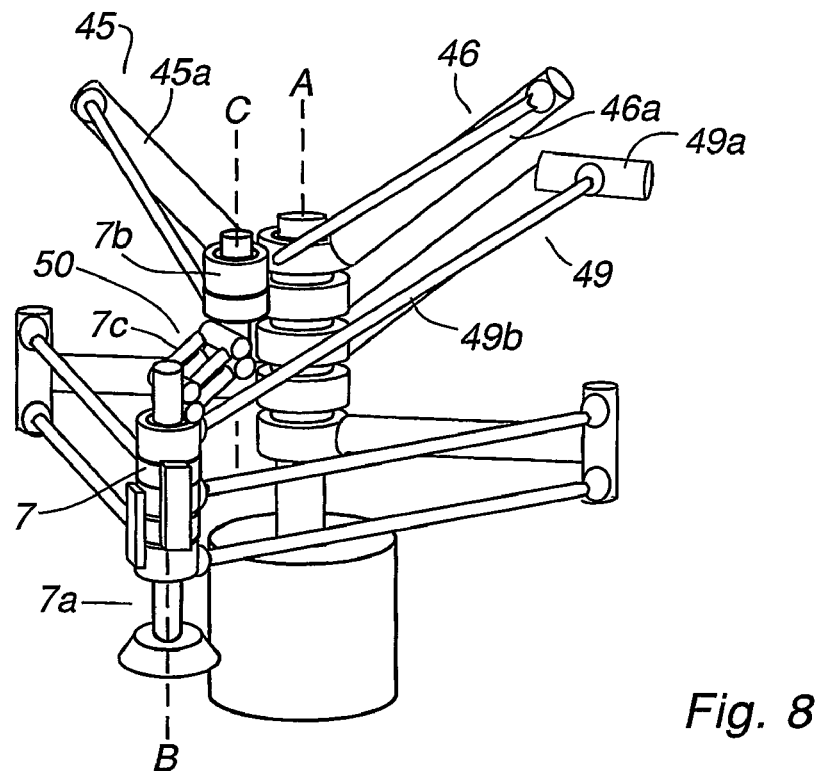
FIG. 8 is an industrial robot according to FIG. 7 with an extra kinematic degree of freedom.

An alternative to the arrangement in FIG. 7 is to connect part 7a of the platform to the redundant arm 49, whereby the position of part 7a is controlled. The first arm parts 45a and 46a are then used only for the rotation of the platform 7a. However, in this case the manipulation of the platform part 7a must be made independent of the position of the platform part 7a and therefore an arrangement for the parallel movement of platform parts 7a and 7b is needed. This arrangement will add a kinematic degree of freedom through a single axis joint 50, which is shown in FIG. 8. In this embodiment, the redundant second arm part 49b is connected to the platform part 7a, which is pivoting about the axis B. The platform part 7c comprises a double parallel four-link system allowing the platform part 7b to rotate about the axis C, which due to the link system remains provided parallel to the axis A and B.

Figure 9:
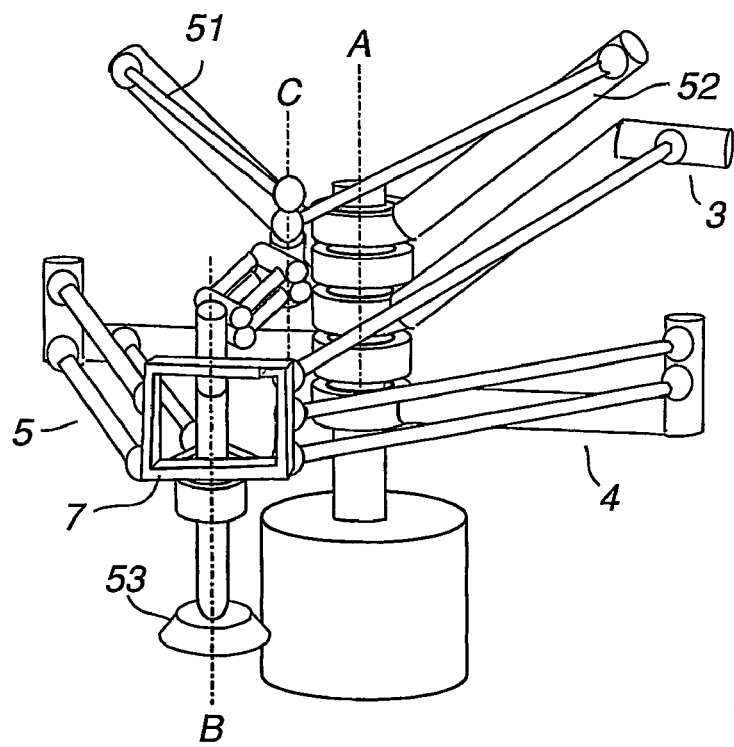
FIG. 9 is an alternative embodiment of the robot according to the invention for manipulation and rotation of a tool.

FIG. 9 is an alternative embodiment of the robot according to the invention. The robot is of the second arm part combination 3/2/1 comprising links corresponding to the first arm parts 3, 4 and 5 in FIG. 1. Two redundant arms 51 and 52, respectively, are arranged to bring a tool 53 arranged on the platform 7 in endless rotation. The tool 53 is arranged to rotate about the axis B, which in its turn is parallel to both axes A and C.

Figure 10:
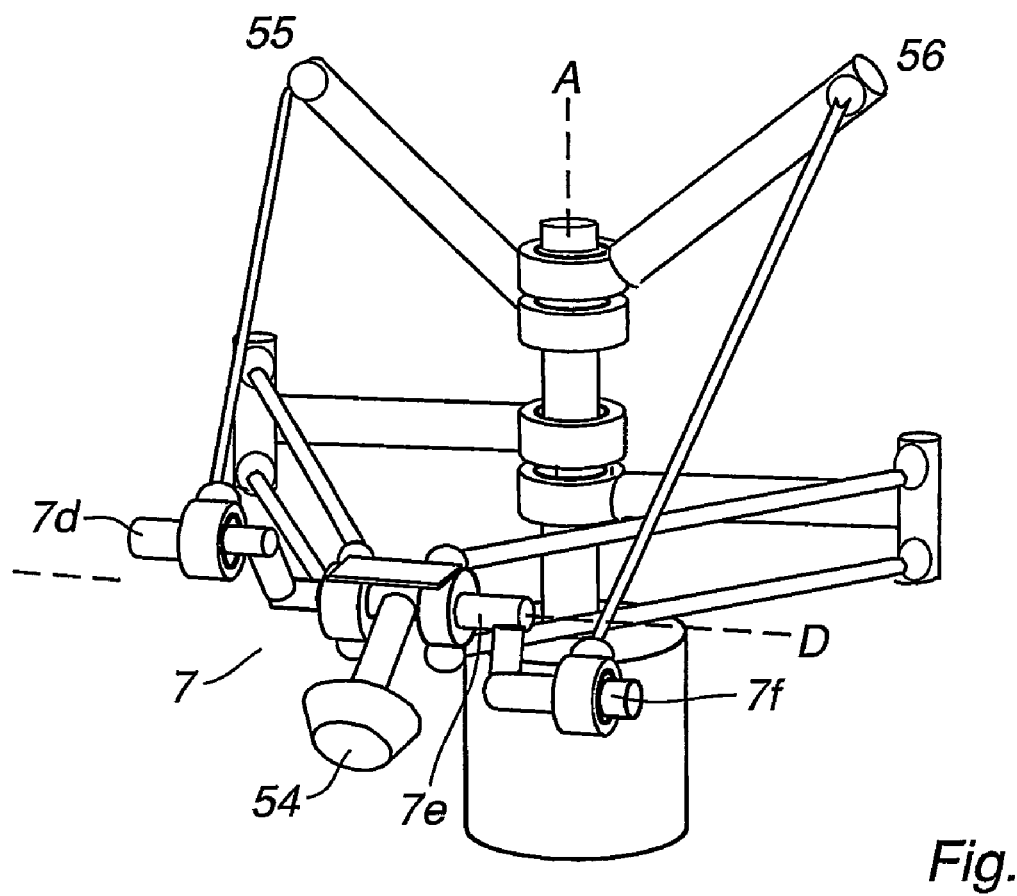
FIG. 10 is a robot according to FIG. 5 comprising an alternative platform.

FIG. 10 is an alternative embodiment of the robot in FIGS. 1-4 comprising a redundant arm 56. The platform 7 is designed to comprise three parallel crank parts 7d, 7e and 7f, respectively, connected by two connecting parts 7g and 7h. These five parts together form a pedal structure with a horizontally extended central part 7e carrying a tool 54 and two pedal parts 7g and 7h arranged in each end of the extended part 7e and connected to the arms 55 and 56 for rotation of the platform 7. The pedal parts 7d and 7f, respectively, are displaced 90° in relation to the axis of rotation. Rotation of the platform 7 results in tilting of the tool 54.

FIGS. 6, 7, 8, 9 and 10 are robots provided with two arms for rotation of an object to be manipulated.

Figure 11:
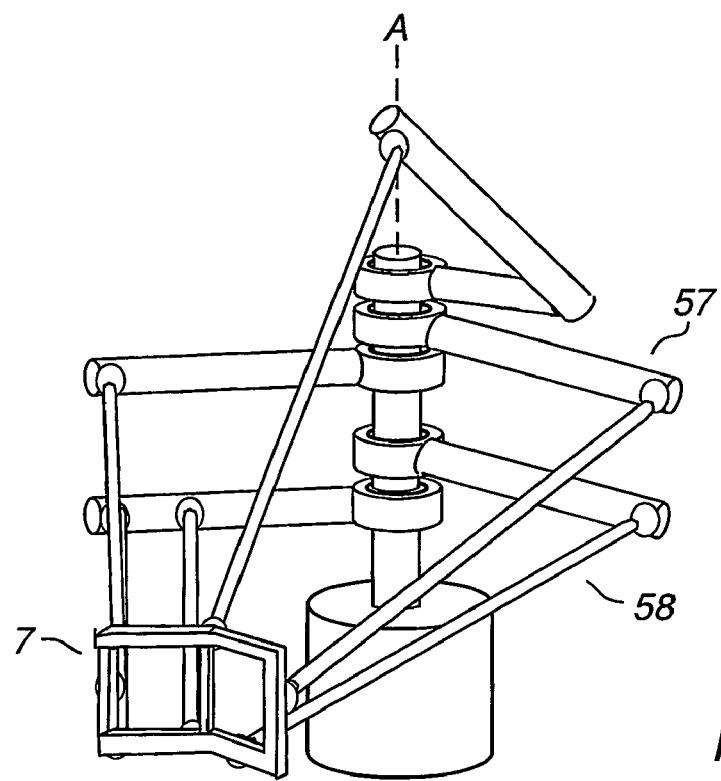
FIG. 11 is a modification of the industrial robot of FIGS. 1-4.

FIG. 11 is a robot according to the invention of the combination 2/1/1/1/1. The design of the robot is a modification of the robot according to FIGS. 1-4, where the arm 4 is replaced by two arms 57 and 58, respectively, both comprising a first arm part 57a and 58a, respectively, and a second arm part 57b and 58b, respectively. The second arm parts 57b and 58b, respectively, includes one single link each. The robot manipulates the platform 7 in five degrees of freedom.

Figure 12:
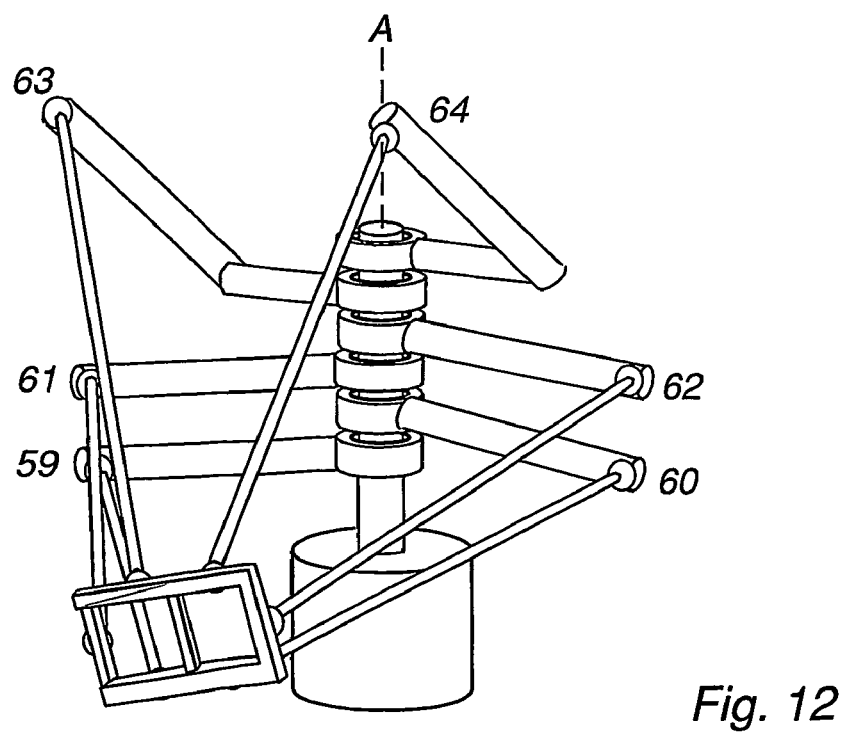
FIG. 12 is an industrial robot according to the invention with six arms.

FIG. 12 is an industrial robot according to the invention of the combination 1/1/1/1/1/1, which comprises six arms 59, 60, 61, 62, 63 and 64, respectively, each arm comprising a first arm part and a second arm part, the latter of which includes a single link. This robot has the possibility to manipulate all six degrees of freedom as defined above.

Figure 13:
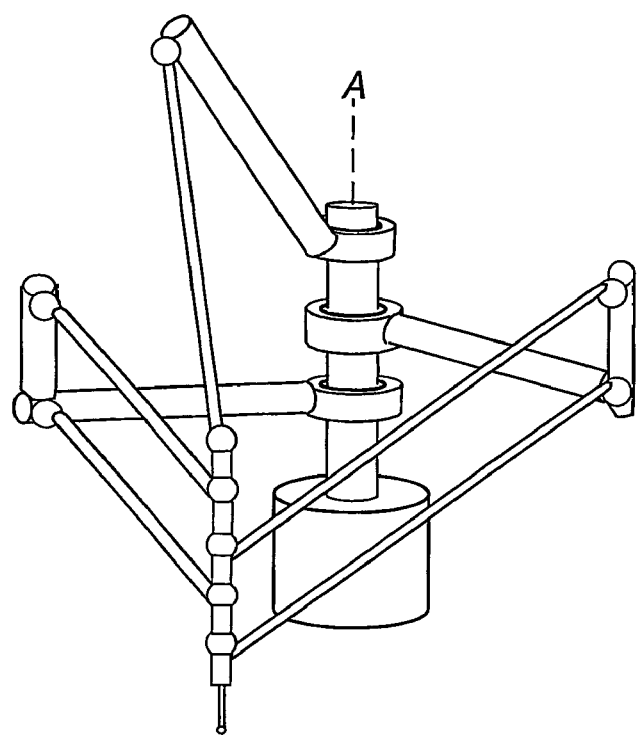
FIG. 13 is an industrial robot according to FIGS. 1-4.

FIG. 13 is a robot according to the invention of the combination 2/2/1 comprising a manipulator with five degrees of freedom.

Figure 14:
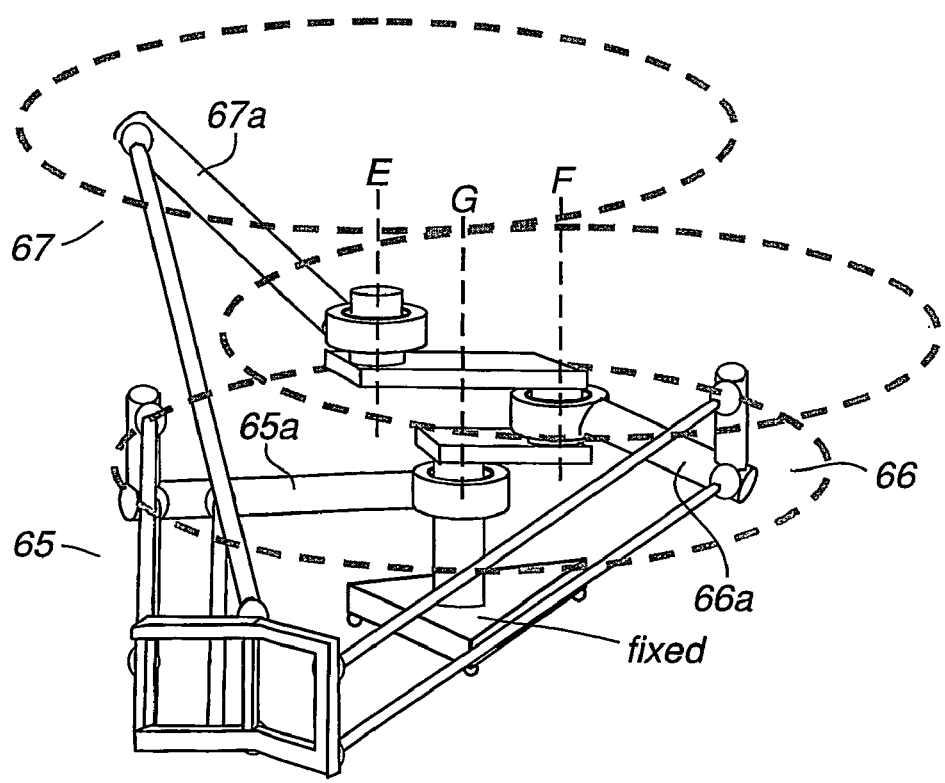
FIG. 14 is an industrial robot according to the invention with three arms rotating around parallel axes.
Figure 15:
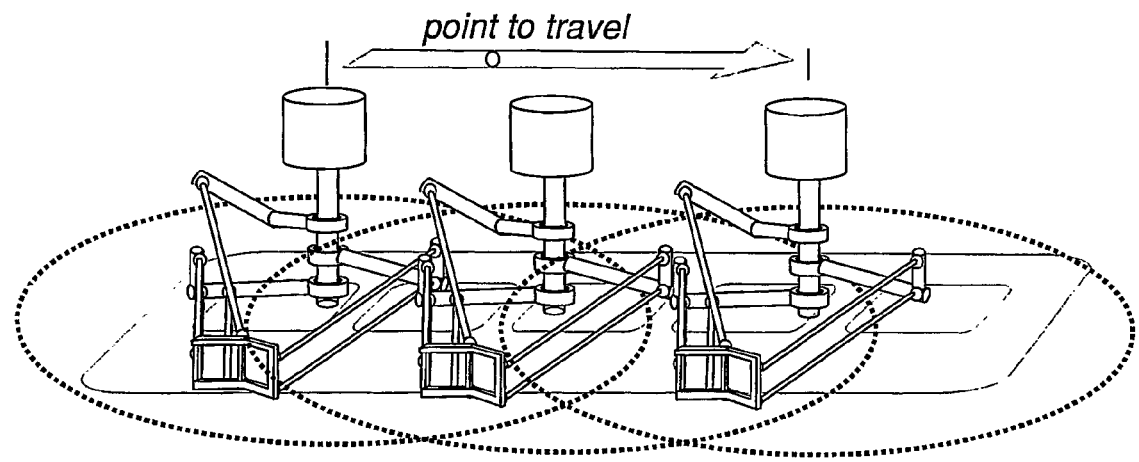
FIG. 15 shows three ceiling-mounted robots working side by side close to each other.
Figure 16:
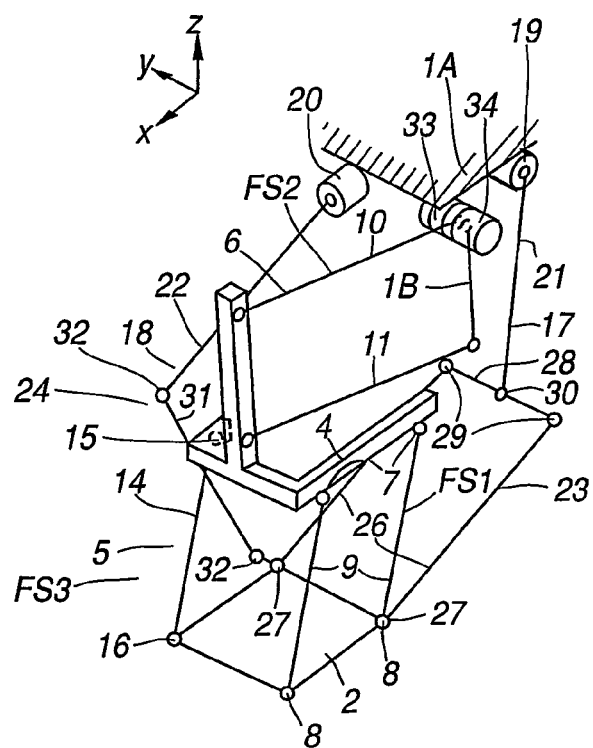
FIG. 16 is FIG. 1 from the prior art document WO 97/33726

FIG. 14 is an alternative industrial robot according to the invention comprising three arms 65, 66 and 67. Each arm comprises a supporting first arm part 65a, 66a and 67a, respectively, and these first arm parts are arranged to rotate around the parallel axes G, F and H, respectively. In this embodiment the stationary column has a modified design adapted for the rotation of the arms. This embodiment allows endless rotation and results both in a operating volume and an unused operating volume, defined above, which varies over a revolution in both size and shape.

Figure 17:
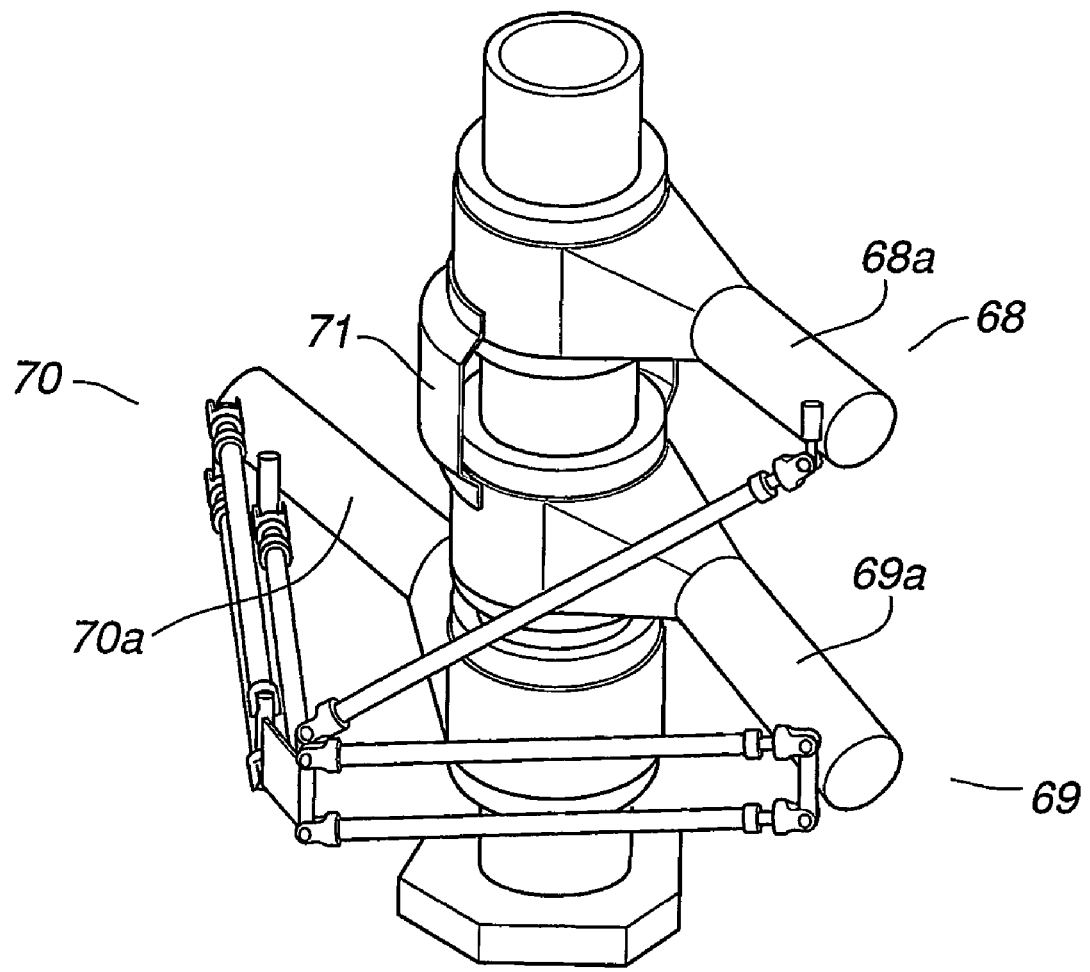
FIG. 17 is an industrial robot according to the invention working in a plane.

FIG. 17 is an alternative industrial robot according to the invention comprising three arms 68, 69 and 70. Each arm comprises a supporting first arm part 68a, 69a and 70a, respectively, and two of these first arm parts, 68a and 69a are secured relative to each other through securing means 71. This robot is working in a plane (2DOF).

While only certain preferred features of the present invention have been illustrated and described, many modifications and changes will be apparent to those skilled in the art. A modification is to arrange the stationary platform on a movable foundation included in a larger arrangement. It is therefore to be understood that all such modifications and changes of the present invention fall within the scope of the claims.

The invention claimed is:

1. An industrial robot, comprising:
a parallel kinematic manipulator for movement of an object in space, the manipulator comprising
a stationary platform,
a movable platform for carrying the object,
at least three arms operatively connecting the stationary platform and the movable platform, each of the at least three arms comprising a first arm part and a second arm part, each first arm part being independently and operatively connected to the stationary platform in a different horizontal plane for rotation around an axis, wherein each axis that the first arm parts rotate about is parallel, each second arm part comprising a link arrangement operatively connecting the first arm part to the movable platform, at least one of the link arrangements comprising at least two links each pivotably connected to the first arm part and the movable platform, each second arm part only transmitting forces along its longitudinal axis to the movable platform, each first arm part of one of the arms being separately actuated to bring the object to be manipulated into rotation about the stationary platform.

2. The industrial robot according to claim 1, wherein each of the at least three first arm parts is arranged to rotate around one of at least two parallel axes.

3. The industrial robot according to claim 2, wherein the at least two axes of rotation coincide.

4. The industrial robot according to claim 1, wherein the stationary platform comprises a column.

5. The industrial robot according to claim 4, wherein the column is arranged with a detachable robot stand in either end of the column.

6. The industrial robot according to claim 4, wherein the robot is mounted in a ceiling position.

7. The industrial robot according to claim 4, wherein the robot is mounted in a wall position.

8. The industrial robot according to claim 4, wherein the robot is mounted in a floor position.

9. The industrial robot according to claim 1, wherein the manipulator comprises four arms, each comprising a first arm part independently and operatively connected to the stationary platform in a different plane for rotation around an axis.

10. The industrial robot according to claim 1, wherein the manipulator comprises five arms, each comprising a first arm part independently and operatively connected to the stationary platform in a different plane for rotation around an axis.

11. The industrial robot according to claim 1, wherein the manipulator comprises six arms, each comprising a first arm part independently and operatively connected to the stationary platform in a different plane for rotation around an axis.

12. The industrial robot according to claim 11, wherein each of the six arms is connected to the movable platform by one single link.

13. The industrial robot according to claim 1, wherein the manipulator comprises at least one redundant arm.

14. The industrial robot according to claim 1, wherein the axes that the at least three arms independently and endlessly rotate about are collinear.

15. The industrial robot according to claim 1, wherein the at least three arms each rotate in one of three separate parallel planes.

16. The industrial robot according to claim 1, wherein the manipulator further comprises actuating means for actuating the arms.

17. The industrial robot according to claim 1, wherein the at least three arms are configured to rotate together endlessly to rotate the movable platform entirely about the stationary platform.

18. A method for manipulating an object in space, the method comprising:

providing an industrial robot comprising a parallel kinematic manipulator for movement of an object in space, the manipulator comprising a stationary platform, a movable platform for carrying the object, and at least three arms operatively connecting the stationary platform and the movable platform, each of the at least three arms comprising a first arm part and a second arm part, each first arm part being independently and operatively connected to the stationary platform in a different horizontal plane for rotation around an axis, wherein each axis that the first arm parts rotate about is parallel, each second arm part comprising a link arrangement operatively connecting the first arm part to the movable platform, at least one of the link arrangements comprising at least two links each pivotably connected to the first arm part and the movable platform, each second arm part only transmitting forces along its longitudinal axis to the movable platform, each first arm part of one of the arms being separately actuated to bring the object to be manipulated into rotation about the stationary platform;

supporting the object on the moveable platform; and manipulating the object through rotation of the first arm parts about the axis in different planes and transmission to the moveable platform of only forces along the longitudinal axis of the second arm parts.

19. The method according to claim 18, wherein the at least three arms are brought to rotate around in one of at least two parallel axes in three separate parallel planes.

20. The method according to claim 18, wherein the at least three arms are brought to rotate around a common axis in three separate parallel planes.

21. The method according to claim 18, wherein the arms are brought to manipulate an object in constant inclination.

22. The method according to claim 18, wherein six robot arms are brought to manipulate the object in one degree of freedom each, each robot arm being brought to comprise a first arm part independently and operatively connected to the stationary platform in a different plane for rotation around an axis.

23. The method according to claim 18, wherein the operation volume of the robot is brought to vary during rotation.

24. The method according to claim 18, wherein at least one redundant arm is bringing the object into endless rotation about the stationary platform.

25. The method according to claim 18, wherein the movable platform is endlessly rotated about the stationary platform.

* * * * *